_United States Patent Office_

3,590,024
Patented June 29, 1971

3,590,024
METHOD OF PRODUCING RANDOM COPOLY-
MERS OF A CONJUGATED DIENE AND AN
α-OLEFIN
Yuzo Ishizuka and Koichi Irako, Tokyo, Japan, assignors to Bridgestone Tire Company Limited, Tokyo, Japan
No Drawing. Filed Aug. 20, 1969, Ser. No. 851,719
Claims priority, application Japan, Aug. 30, 1968, 43/61,743
Int. Cl. C08d 3/02; C08f 15/04
U.S. Cl. 260—85.3      24 Claims

ABSTRACT OF THE DISCLOSURE

A method of producing random copolymers of a conjugated diene and an α-olefin by contacting a mixture of said conjugated diene and said α-olefin with a catalyst system consisting of a component (A) of a compound selected from the group consisting of chlorides and bromides of titanium, and oxychlorides of vanadium, and a component (B) of an organoaluminum compound having the general formula $AlR_3$, wherein R represents a hydrocarbon radical, in the presence of a high molecular weight polyether, which promotes the copolymerization reactivity of the α-olefin.

---

The present invention relates to a method of producing random copolymers of a conjugated diene and an α-olefin.

It has hitherto been well-known that in a copolymerization of a conjugated diene and an α-olefin, the copolymerizability of the α-olefin is poor.

As the result, it is difficult to produce random copolymers of a conjugated diene and an α-olefin containing a large amount of α-olefin, and even if relatively highly randomized copolymers are obtained, the copolymers contain a large amount of gel insoluble in solvent, and therefore the copolymers cannot be used practically.

When a conjugated diene and an α-olefin are copolymerized with the use of a Ziegler catalyst, which can homopolymerize each conjugated diene and α-olefin, a homopolymer of the conjugated diene is obtained, only a small amount of the α-olefin is polymerized, or block copolymer is obtained.

The present invention provides a method for solving these problems. That is, the present invention provides a method of producing random copolymers by contacting a mixture of a conjugated diene and an α-olefin with a catalyst system consisting of a component (A): at least one compound selected from the group consisting of chlorides and bromides of titanium, and oxychlorides of vanadium, and
a component (B): at least one organoaluminum compound having the general formula $AlR_3$, wherein R represents a hydrocarbon radical having 1–10 carbon atoms, in the presence of a high molecular weight polyether obtained by a ring-opening polymerization of at least one of alkylene oxide, and tetrahydrofuran.

According to the present invention, the reactivity of α-olefin and the percentage of random copolymerization of α-olefin can be improved in the copolymerization of a conjugated diene and an α-olefin, and further random copolymers free of gel insoluble in solvent can be produced. The term "percentage of random copolymerization" herein means the ratio of the amount of randomly copolymerized α-olefin units to the total amount of α-olefin contained in the copolymer. This ratio can be calculated from the amount of α-olefin polymer recovered after the oxidative degradation (I. M. Kolthoff, J. Polymer Sci., 1, 429 (1946)) of the copolymer by using osmium tetraoxide and tert-butyl hydroperoxide.

According to the present invention, random copolymers of a conjugated diene and an α-olefin, in which the composition of the conjugated diene and the α-olefin varies within a broad range, can be produced. The present invention is particularly effective for increasing the reactivity of α-olefin, when the reactivity of α-olefin is extremely inferior to that of conjugated diene. For example, when isoprene and pentene-1 are copolymerized in the presence of a well-known titanium tetrachloride-triethylaluminum catalyst system ($AlEt_3/TiCl_4 = 1.08$ molar ratio), the ratio of the copolymerization reactivities are r(isoprene) of 10 and r(pentene-1) of 0.1, but when polypropylene oxide of the high molecular weight polyether is further added, the ratio of the copolymerization reactivities are r(isoprene) of 3.0 and r(pentene-1) of 0.35, which shows increasing of the reactivity of pentene-1.

Even when a conjugated diene is homopolymerized by the use of a catalyst system consisting of a component (A): at least one compound selected from the group consisting of chlorides and bromides of titanium, and oxychlorides of vanadium, and
a component (B): at least one organoaluminum compound having the general formula $AlR_3$, wherein R represents a hydrocarbon radical having 1–10 carbon atoms, if the homopolymerization is carried out in the presence of a high molecular weight polyether obtained by ring-opening polymerization of at least one of alkylene oxide, and tetrahydrofuran, the homopolymerization rate is accelerated.

The method of the present invention will be explained more specifically and practically.

The conjugated diene to be used in present invention includes conjugated dienes having 4–8 carbon atoms, for example, butadiene, isoprene, 1,3-pentadiene, 1,3-hexadiene, 2,3-dimethylbutadiene, and their mixtures. Among them, butadiene, isoprene and a mixture of both the monomers are preferable.

The α-olefin to be used in the present invention includes hydrocarbons having 2–8 carbon atoms, for example, ethylene, propylene, butene-1, pentene-1, hexene-1, isobutene, etc., and their mixtures. Among them, α-olefins having 2–5 carbon atoms, for example, ethylene, propylene and their mixture are preferably used.

The catalyst system to be used in the present invention consists of:

a component (A): at least one compound selected from the group consisting of chlorides and bromides of titanium, and oxychlorides of vanadium, and
a component (B): at least one organoaluminum compound having the general formula $AlR_3$, wherein R represents a hydrocarbon radical having 1–10 carbon atoms.

As the catalytic component (A), use may be made of, for example, titanium tetrachloride, titanium trichloride, titanium tetrabromide, vanadium oxychloride, etc. Among them, titanium tetrachloride, titanium tetrabromide, and vanadium oxychloride are preferably used.

As the catalytic component (B), use may be made of trialkylaluminum, for example, trimethylaluminum, triethylaluminum, tri-n-propylaluminum, triisopropylaluminum, triisobutylaluminum, tri-n-butylaluminum, tri-tert-butylaluminum, etc. Among them, triethylaluminum triisobutylaluminum are preferably used.

The high molecular weight polyether to be used together with the above-mentioned catalyst in the present invention includes high molecular weight polyethers obtained by the ring-opening polymerization of alkylene oxide, and tetrahydrofuran. Examples of the alkylene oxide are ethylene oxide, propylene oxide, 1-butene oxide, 2-butene oxide, isobutylene oxide, 1-hexene oxide, etc. Among the above-mentioned high molecular weight polyethers, ones obtained by the ring-opening polymerization of propylene oxide or tetrahydrofuran are preferably used.

The high molecular weight polyether may be crystalline or non-crystalline. The polymerization degree of the high molecular weight polyether is greater than 9, preferably greater than 99.

In the present invention, the molar ratio of oxygen atoms in the ether linkage of the high molecular weight polyether to aluminum atoms in the organoaluminum compound of the above-mentioned catalytic component (B) is 0.01-10, preferably 0.5-5. When said molar ratio is less than 0.01, the activity of α-olefin lowers, and it is not different from the case when the high molecular weight polyether is not added.

In the present invention the molar ratio of the catalytic component (A) to the catalytic component (B) is 0.75-15, preferably 1-4.

The amounts of the catalytic components (A) and (B) to be used in the present invention can be varied within a broad range respectively, but in general, the amount of the component (B) is at least 0.05 mol percent based on the amount of monomers to be polymerized. The upper limit of the amount of the component (B) is determined depending upon the desired intrinsic viscosity of copolymers to be obtained.

Concerning the order for adding the catalytic components in the present invention, it is preferable to add the solvent, the polyether, the catalytic component (B) and the catalytic component (A) in this order, but the other orders may be used.

The temperature in the addition of the catalytic components is not specifically limited, but it is preferable to mix them at a temperature of about 0–40° C. In this case, it is preferable to mix them in a solvent, which dissolves the high molecular weight polyether but does not react with the catalytic component (B).

Furthermore, the catalytic components may be mixed in the monomers to be copolymerized. The aging of the above-mentioned catalyst system is not usually necessary particularly, but the aging is effective for slow reactants.

In the present invention, a conjugated diene and an α-olefin are copolymerized usually in the presence of a solvent. The feed ratio of the conjugated diene to the α-olefin can be varied within a range of 1:99–97:3 (molar ratio), which is determined depending upon the desired composition ratio of the copolymer to be obtained. It is desirable that the obtained copolymer contains 1–95 mol percent of conjugated diene unit.

The polymerization reaction in the invention can be effected at a temperature range of −78∼+150° C., preferably 0∼80° C.

The polymerization reaction can be effected under a pressure generated autogenously.

As the solvent of the present invention, use may be made of hydrocarbons, such as, propane, isobutane, n-pentane, n-hexane, isooctane, n-decane, cyclopentane, cyclohexane, methylcyclopentane, ethylcyclopentane, dimethylcyclopentane, benzene, toluene, xylene, ethylbenzene, etc. Among them, solvents capable of dissolving the high molecular weight polyether, for example, toluene, benzene, xylene, ethylbenzene, cyclohexane and the like are preferably used.

In the present invention, it is very desirable that the polymerization system does not contain substances, which deactivate the catalyst system, such as carbon dioxide, oxygen, water, etc.

After the completion of the polymerization reaction, the after-treatment is effected by any conventional methods, and one of preferable methods is to add a substance, which deactivates the catalyst system, for example, water, alcohols, such as ethyl alcohol and methyl alcohol, or inorganic acids, to the polymerization mixture. It is effective to add an antioxidant for the copolymer, such as phenyl-β-naphthylamine, to the polymerization mixture prior to the recovery of the resulting copolymer.

The resulting copolymer in the polymerization solution is recovered after the reagent deactivating the catalyst system and the antioxidant are added to the solution. The copolymer can be recovered by conventional methods, for example, by adding non-solvent for the copolymer, by steam-stripping, by drying under reduced pressure, or the other various methods. Further purification of the copolymer can be advantageously effected by dissolving again the separated copolymer in a proper solvent and adding alcohol to the solution to precipitate again the purified copolymer.

Furthermore, when the copolymer of the present invention is vulcanized as in case of other diene homopolymer rubber or copolymer rubber, useful rubber articles, such as, tire, belt, sole of shoe, etc., can be produced.

The following examples are given in illustration of the invention and are not intended as limitations thereof.

EXAMPLES 1–3

A pressure bottle of 100 ml. capacity was substituted with nitrogen in the interior. Then, toluene, a solution of polypropylene oxide having a molecular weight of 100,000 in toluene, 2.85 mmoles of triethylaluminum in toluene and 2.64 mmoles of titanium tetrachloride in toluene were charged into the pressure bottle in this order so that the total amount of the toluene was 32 ml. Then, a mixture of 0.121 mole of butadiene and 0.0519 mole of propylene, which had previously been trapped in a monomer sampling tube, was added to the pressure bottle, and a copolymerization reaction was effected at room temperature for 4 hours.

A control experiment was effected in the same manner as described in Examples 1–3, except that polypropylene oxide was not added, which was Comparative Example 1.

The obtained result is shown in the following Table 1.

In Table 1, the propylene content of the copolymer was determined by titrating with iodine monochloride. The intrinsic viscosity $[\eta]$ was measured in toluene at 30° C. $n$ shows the molar ratio of oxygen atoms in the ether linkage of the polyether to trialkylaluminum.

TABLE 1

|  | $n$ | Conversion (percent) | $[\eta]$ | Propylene content (mol percent) | Percentage of random copolymerization (percent) |
|---|---|---|---|---|---|
| Example No.: |  |  |  |  |  |
| 1 | 0.5 | 58.3 | 0.56 | 30.2 | 70.4 |
| 2 | 1.0 | 56.9 | 0.84 | 19.8 | 48.7 |
| 3 | 1.5 | 31.8 | 0.37 | 20.7 | 57.2 |
| Comparative |  |  |  |  |  |
| Example 1 |  | 64.6 | 0.85 | 18.4 | 45.6 |

As seen from the comparison of Examples 1–3 with Comparative Example 1 in Table 1, all the copolymerization reactions effected in the presence of the polyether are superior to the copolymerization reaction effected in the absence of the polyether in the percentage of random copolymerization of the resulting copolymer and in the reactivity of propylene.

EXAMPLES 4–10

In these examples, copolymerization reactions were effected in the same manner as described in Examples 1–3, except that a mixture of 0.100 mole of isoprene and 0.0429 mole of propylene was used instead of the mixture of butadiene and propylene, to obtain a result as shown in the following Table 2.

As a control, the same copolymerization reaction was effected in the absence of the polyether, which was Comparative Example 2, and the result is also shown in Table 2.

TABLE 2

| Kind of polyethers | | n | Conversion (percent) | [η] | Propylene content (mol percent) | Percentage of random copolymerization (percent) |
|---|---|---|---|---|---|---|
| Example No.: | | | | | | |
| 4 | Polypropylene oxide | 0.5 | 76.2 | 0.91 | 18.6 | 14.5 |
| 5 | do | 1.0 | 55.9 | 1.00 | 17.4 | 41.8 |
| 6 | do | 1.5 | 37.0 | 1.59 | 14.9 | 68.4 |
| 7 | do | 2.0 | 19.0 | 0.84 | 20.2 | 74.9 |
| 8 | Polytetrahydrofuran | 0.5 | 55.6 | 1.02 | 18.6 | 79.0 |
| 9 | do | 1.0 | 43.8 | 0.775 | 14.5 | 79.0 |
| 10 | do | 1.5 | 15.1 | 0.545 | 15.8 | 45.2 |
| Comparative Example 2 | | | 63.6 | 1.14 | 19.0 | 0 |

As seen from Table 2, the copolymerization reaction in the absence of the polyether does not cause random copolymerization, but the copolymerization reaction in the presence of the polyether, such as, polypropylene oxide or polytetrahydrofuran, causes random copolymerization.

EXAMPLES 11–12

A glass reaction bottle of 50 ml. capacity was substituted with nitrogen in the interior. Into the bottle were charged toluene, a solution of polypropylene oxide in toluene, 1.31 mmoles of triethylaluminum in toluene and 1.21 mmoles of titanium tetrachloride in toluene in this order so that the total amount of toluene was 15 ml. Then, a mixture of 0.0455 mole of isoprene and 0.0195 mole of pentene-1 was added to the bottle, and a copolymerization reaction was effected for 1 hour under nitrogen atmosphere to obtain a result as shown in the following Table 3.

As a control, the same copolymerization reaction was effected in the absence of the polyether, which was Comparative Example 3, and the obtained result is also shown in Table 3.

TABLE 3

| | n | Conversion (percent) | [η] | Pentene-1 content (mol percent) | Percentage of random copolymerization (percent) |
|---|---|---|---|---|---|
| Example No.: | | | | | |
| 11 | 1.0 | 58.9 | 0.51 | 20.7 | 81.0 |
| 12 | 1.7 | 49.8 | 0.49 | 10.4 | 42.0 |
| Comparative Example 3 | | 42.4 | 0.65 | 8.18 | 27.5 |

As seen from Table 3, in the copolymerization reactions effected in the presence of the polyether, the percentage of random copolymerization is increased and further the yield of the random copolymer and the reactivity of pentene-1 are increased.

EXAMPLE 13

A copolymerization reaction was effected in the same manner as described in Examples 11 and 12, except that vanadium oxytrichloride was used instead of titanium tetrachloride.

As a control, the same copolymerization reaction was effected in the absence of polypropylene oxide, which was Comparative Example 4.

The obtained results are shown together in the following Table 4.

TABLE 4

| | n | Conversion (percent) | Insoluble part in benzene (percent) | Soluble part in benzene | |
|---|---|---|---|---|---|
| | | | | Content of pentene-1 (mol percent) | Percentage of random copolymerization (percent) |
| Example 13 | 0.5 | 62.3 | 0 | 34.0 | 68.4 |
| Comparative Example 4 | | 78.0 | 16.0 | 45.8 | 58.1 |

Table 4 shows that randomly copolymerized pentene-1, which is soluble in benzene, increases by the addition of the polyether.

EXAMPLE 14

A copolymerization reaction was effected in the same manner as described in Examples 11 and 12, except that triisobutylaluminum and titanium tetrabromide were used instead of triethylaluminum and titanium tetrachloride.

As a control, the same copolymerization reaction was effected in the absence of polypropylene oxide, which was Comparative Example 5.

The obtained results are shown together in the following Table 5.

TABLE 5

| | n | Conversion (percent) | Insoluble part in benzene (percent) | Soluble part in benzene | |
|---|---|---|---|---|---|
| | | | | Content of pentene-1 (mol percent) | Percentage of random copolymerization (percent) |
| Example 14 | 1.5 | 85.1 | 0 | 11.9 | 48.4 |
| Comparative Example 5 | | 81.0 | 75 | 37.6 | 0 |

Table 5 shows that the randomness of pentene-1 is improved by the addition of the polyether.

What is claimed is:

1. A method of producing random copolymers of a conjugated diene having 4–8 carbon atoms with an α-olefin having 2–8 carbon atoms, which comprises contacting a mixture of said conjugated diene and said α-olefin with a catalyst system consisting of
    a component (A): at least one compound selected from the group consisting of chlorides and bromides of titanium, and oxychlorides of vanadium, and
    a component (B): at least one organoaluminum compound having the general formula $AlR_3$, wherein R represents a hydrocarbon radical having 1–10 carbon atoms, the molar ratio of said component (B) to said component (A) being from 0.75 to 15, at a polymerization temperature of $-78 \sim +150°$ C. in a hydrocarbon solvent in the presence of a high molecular weight polyether having a polymerization degree of greater than 9 obtained by ring-opening polymerization of at least one of alkylene oxide, tetrahydrofuran and their derivatives.

2. The method as claimed in claim 1, wherein said conjugated diene is butadiene.

3. The method as claimed in claim 1, wherein said conjugated diene is isoprene.

4. The method as claimed in claim 1, wherein said α-olefin has 2–5 carbon atoms.

5. The method as claimed in claim 1, wherein said α-olefin is propylene.

6. The method as claimed in claim 1, wherein said α-olefin is pentene-1.

7. The method as claimed in claim 1, wherein butadiene and propylene are copolymerized.

8. The method as claimed in claim 1, wherein isoprene and propylene are copolymerized.

9. The method as claimed in claim 1, wherein isoprene and pentene-1 are copolymerized.

10. The method as claimed in claim 1, wherein said component (A) is titanium tetrachloride.

11. The method as claimed in claim 1, wherein said component (A) is titanium tetrabromide.

12. The method as claimed in claim 1, wherein said component (A) is vanadium oxychloride.

13. The method as claimed in claim 1, wherein said component (B) is triethylaluminum.

14. The method as claimed in claim 1, wherein said component (B) is triisobutylaluminum.

15. The method as claimed in claim 1, wherein the catalyst system is titanium tetrachloride-triethylaluminum.

16. The method as claimed in claim 1, wherein the catalyst system is vanadium oxychloride-triethylaluminum.

17. The method as claimed in claim 1, wherein the catalyst system is titanium tetrabromide-triisobutylaluminum.

18. The method as claimed in claim 1, wherein the molar ratio of said component (B) to said component (A) is from 1.0 to 4.0.

19. The method as claimed in claim 1, wherein said high molecular weight polyether is polyethers having a polymerization degree of greater than 99 obtained by a ring-opening polymerization of propylene oxide or tetrahydrofuran.

20. The method as claimed in claim 1, wherein the molar ratio of oxygen atoms in the ether linkage of said high molecular weight polyether to aluminum atoms in said trialkylaluminum of the component (B) is from 0.01 to 10.

21. The method as claimed in claim 1, wherein the molar ratio of oxygen atoms in the ether linkage of said high molecular weight polyether to aluminum atoms in said trialkylaluminum of the component (B) is from 0.5 to 5.0.

22. The method as claimed in claim 1, wherein, said polymerization temperature is 0~80° C.

23. The method as claimed in claim 1, wherein, said hydrocarbon solvent is a hydrocarbon solvent capable of dissolving said high molecular weight polyether.

24. The method as claimed in claim 1, wherein said hydrocarbon solvent is toluene.

References Cited
UNITED STATES PATENTS

| | | | |
|---|---|---|---|
| 3,203,940 | 8/1965 | Long | 260—88.2 |
| 3,205,205 | 9/1965 | Adams | 260—88.2 |
| 3,317,496 | 5/1967 | Natta et al. | 260—88.2 |
| 3,407,185 | 10/1968 | Natta | 260—85.3 |
| 3,436,379 | 4/1969 | Keith et al. | 260—80.7 |
| 3,470,144 | 9/1969 | Minekawa et al. | 260—85.3 |

JOSEPH L. SCHOFER, Primary Examiner

R. A. GAITHER, Assistant Examiner